United States Patent [19]
Jeitner

[11] Patent Number: 5,958,530
[45] Date of Patent: Sep. 28, 1999

[54] METHOD OF MAKING EXTRUDED POLYETHLYENE PIPES

[75] Inventor: Klaus-Dieter Jeitner, Hamburg, Germany

[73] Assignee: Uniroyal Chemical Company, Inc., Middlebury, Conn.

[21] Appl. No.: 08/264,212

[22] Filed: Jun. 17, 1994

Related U.S. Application Data

[63] Continuation of application No. 07/768,600, Sep. 13, 1991, abandoned, which is a continuation of application No. PCT/EP90/00434, Mar. 15, 1990.

[30] Foreign Application Priority Data

Mar. 17, 1989 [DE] Germany ............................ 39 08 798

[51] Int. Cl.⁶ .................................................. C08L 23/00
[52] U.S. Cl. .......................................... 428/35.7; 525/240
[58] Field of Search ................................. 428/34.9, 35.1, 428/35.7; 525/240

[56] References Cited

U.S. PATENT DOCUMENTS

| | | | |
|---|---|---|---|
| 4,321,292 | 3/1982 | Blomgvist | 428/35.1 |
| 4,722,971 | 2/1988 | Datta et al. | 525/240 |
| 4,843,129 | 6/1989 | Spenadel et al. | 525/52 |
| 4,960,829 | 10/1990 | Allen et al. | 525/193 |
| 5,030,694 | 7/1991 | Kelley | 525/240 |

FOREIGN PATENT DOCUMENTS

| | | |
|---|---|---|
| 0019990 | 3/1980 | European Pat. Off. . |
| 0064403 | 4/1982 | European Pat. Off. . |
| 0087344 | 2/1983 | European Pat. Off. . |
| 3908798 | 1/1991 | Germany . |
| 55154404 | 5/1982 | Japan . |
| 57-126218 | 8/1982 | Japan ....................... 525/240 |

OTHER PUBLICATIONS

"Hawley's Condensed Chemical Dictionary", Lewis (Twelth Edition, 1993) p. 933, "Polyethylene".

*Primary Examiner*—Cecilia J. Tsang
*Assistant Examiner*—Patrick R. Delaney
*Attorney, Agent, or Firm*—Raymond D. Thompson

[57] ABSTRACT

The invention relates to a process for the production of plastic parts, particularly pipes and sleeves, by the extrusion of a mixture of polyethylene homopolymer, copolymer or block polymer (PE) and a polymeric plasticizer reactive therewith, as well as small amounts of conventional additives, in which the moulded or extruded plastic part optionally subsequently undergoes cross-linking and stretching, or cross-linking only, in which a mixture of PE and EPDM with an average molecular weight of 1,000 to 20,000 in a weight ratio of 90 to 97% PE and 3 to 10% by weight EPDM is moulded or extruded.

1 Claim, No Drawings

METHOD OF MAKING EXTRUDED POLYETHLYENE PIPES

This application is a continuation of U.S. application Ser. No. 07/768,600, filed Sep. 15, 1991 now abandoned, which is a continuation of PCT application PCT/EP90/00434 and is entitled to claim foreign priority benefits under Title 35, United States Code §§119, 120 and 365 (c).

BACKGROUND OF THE INVENTION

The invention relates to a process for producing plastic parts, particularly pipes, by extruding a mixture of a polyethylene homopolymer, copolymer or block polymer (PE) and a polymeric plasticizer reactive therewith, as well as small amounts of conventional additives, the moulded or extruded plastic part subsequently undergoing cross-linking and stretching or a cross-linking only. The invention also relates to a master batch for performing the process.

In this generally known process PE and preferably a high density polyethylene (HDPE) is extruded with a reactive polymeric plasticizer, usually with an ethylene vinyl acetate polymer (EVA) and conventional additives, the extruded plastic component then being cross-linked and/or stretched. This process is in particular used for producing pipes, such as water pipes, or shrunk-on sleeves. The cross-linking or stretching takes place to an extent adapted to the intended use, so as to e.g. bring about an adequate shrinking on in the joining regions as a result of heating on joining pipe sections or sleeves.

When performing this process the plastics to be extruded are generally made available as a granular material in a master batch containing the reactive plasticizer and the remaining additives, such as antioxidants, fillers and pigments in a larger proportion of e.g. 10 to 30 and preferably 20% by weight, whilst the remainder of e.g. 70 to 90 and preferably 80% by weight consists of polyethylene. Prior to extrusion, these master batches are then blended with further polyethylene, e.g. in quantities of 10 to 50% by weight.

In hitherto used mixtures of PE and EVA as the reactive plasticizer, the disadvantage has been found that on producing pipes or sleeves there is an irksome splitting off of acetic acid from the EVA under heat action. In addition, the thermal stability of such plastic mixtures is inadequate. It has also been found that the thus produced PE-EVA pipes are relatively rigid and do not have an adequate flexibility.

The problem of the present invention is to improve the aforementioned process or make available master batches making it possible to produce more thermally stable products which, on heating during production, do not split off acetic acid and which in particular have a better flexibility.

SUMMARY OF THE INVENTION

For solving this problem a process according to the main claim is proposed, particularly preferred embodiments appearing in the subclaims.

It has surprisingly been found that when using a mixture of 90 to 97% PE and in particular a high density polyethylene (HDPE) and 3 to 10% by weight EPDM as the reactive polymeric plasticizer, in each case based on the polymeric components, it is possible to obtain pipes or shrunk-on sleeves with a very greatly improved flexibility, the degree of cross-linking being somewhat lower and the crystallinity somewhat higher than was e.g. the case with pipes made from the known PE/EVA compositions.

DETAILED DESCRIPTION OF THE INVENTION

The most varied types of polyethylenes, including copolymers or block polymers and in particular those with a density of 0.94 at 25° C. (HPDE) are known and are e.g. described in U.S. Pat. No. 3,592,881.

In addition, ethylene/propylene/diene monomer terpolymer (EPDM) are known as reactive plasticizers, together with mixtures of EPDM types and HDPE types, e.g. from U.S. Pat. Nos. 3,758,643, 3,862,106 and 3,835,201. However, neither these, nor numerous other literature references disclose EPDM terpolymers with a molecular weight in the range 1,000 to 20,000 and particularly 5,000 to 10,000 for extruding shrinkable PE plastic parts, particularly pipes or shrunk-on sleeves.

The preferably used EPDM types are liquid terpolymers of ethylene and propylene, into whose saturated polymer main chain is introduced as the third monomer a non-conjugate diene such as dicyclopentadiene, 5-ethylidene-2-norbornene or 1,4-hexadiene.

The inventively preferred liquid EPDM types e.g. have a molecular weight of 6,500 with a Brookfield viscosity of 500,000 to 580,000 at 60° C. and 70 to 65,000 at 100° C. Other types with a molecular weight of approximately 8,000 have a Brookfield viscosity of 800,000 cps at 60° and 80,000 at 100° C.

In order to show the advantageous effect of the inventive plastic mixtures, PE-plastic mixtures were investigated with respect to their physical characteristics on the one hand with a EVA and on the other with a EPDM as the reactive plasticizer.

EXAMPLES

The polyethylene used was a HDPE with a density of 0.942 to 0.945 g/cm$^3$ and a melt index of 5.4 to 6.8. Based on the total mixture, the additives used were approximately 2% by weight of a thermal carbon black, approximately 0.4% by weight of a phenolic antioxidant and approximately 0.2% by weight of a high molecular weight, phenolic oxamide antioxidant.

The composition of the comparison product and the inventive product were as follows:

|  | Comparison Product | Inventive Product |
| --- | --- | --- |
| Components |  |  |
| HDPE | 94.00% by weight | 92.40% by weight |
| Additives | 2.66% by weight | 2.60% by weight |
| EVA | 3.24% by weight | — |
| EPDM mol. wt. 6500 | — | 5.00% by weight |
| Measured Physical Values |  |  |
| Degree of cross-linking | 67.98% by weight | 63.09% by weight |
| Crystallinity | 48.6% by weight | 53.0 by weight |
| Melt enthalpy | 140.89 J/g | 153.81 J/g |
| Crystallite melting point | 126.5° C. | 128.7° C. |
| Oxidation resistance | 254.1° C. | 254.3° C. |
| Modulus of electricity | 694.83 N/mm$^2$ | 696.92 N/mm$^2$ |
| Density | 0.8839 g/cm$^3$ | 0.8666 g/cm$^3$ |
| Flexibility | rigid | good |

I claim:
1. Shrunk-on sleeve means, made from a mixture comprising:
   (a) 90 to 97 weight percent polyethylene, wherein the polyethylene is a high density polyethylene having a density of 0.942 g/cm$^3$ to 0.945 g/cm$^3$, and (b) 3 to 10 weight percent EPDM as the reactive polymeric plasticizer.

* * * * *